(12) United States Patent
Masaki

(10) Patent No.: US 7,369,063 B2
(45) Date of Patent: May 6, 2008

(54) ENCODER SIGNAL PROCESSING CIRCUIT INCLUDING A DIRECTION DETERMINING/COUNTING UNIT

(75) Inventor: Yoshihisa Masaki, Sagamihara (JP)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/512,835

(22) Filed: Aug. 29, 2006

(65) Prior Publication Data

US 2007/0069925 A1   Mar. 29, 2007

(30) Foreign Application Priority Data

Aug. 30, 2005   (JP)   ............... 2005-249747

(51) Int. Cl.
*H03M 1/22*   (2006.01)
(52) U.S. Cl. .............................. 341/6; 341/1
(58) Field of Classification Search ............... 341/6–90
See application file for complete search history.

(56) References Cited

U.S. PATENT DOCUMENTS

| | | | |
|---|---|---|---|
| 4,476,420 A * | 10/1984 | Asakawa | ............. 341/13 |
| 4,559,524 A | 12/1985 | Suzuki | |
| 4,570,154 A * | 2/1986 | Kinghorn et al. | ............. 341/26 |
| 5,068,529 A | 11/1991 | Ohno et al. | |
| 5,742,136 A | 4/1998 | Ono et al. | |
| 5,841,035 A * | 11/1998 | Andoh et al. | ............. 73/861.22 |
| 6,271,777 B1 * | 8/2001 | Lentine et al. | ............. 341/100 |
| 7,199,354 B2 * | 4/2007 | Mayer et al. | ............. 341/13 |
| 2003/0184670 A1 | 10/2003 | Hashiguchi et al. | |

FOREIGN PATENT DOCUMENTS

JP   2002-90183   3/2002

* cited by examiner

*Primary Examiner*—Lam T. Mai
(74) *Attorney, Agent, or Firm*—Kenyon & Kenyon LLP

(57) ABSTRACT

An encoder signal processing circuit includes: a plurality of detectors adapted to generate signals with different phases; a switching circuit adapted to alternatively select and output a signal from the detectors; and a waveform shaping circuit adapted to shape waveforms of output signals from the detectors that are switched by the switching circuit. The encoder signal processing circuit may include a direction determining/counting unit adapted to: (a) monitor output signals from the waveform shaping circuit in relation to an operation of the switching circuit, (b) determine a direction of movement and an amount of movement; and (c) calculate the amount of movement.

2 Claims, 7 Drawing Sheets

ENCODER SIGNAL PROCESSING CIRCUIT INCLUDING A DIRECTION DETERMINING/COUNTING UNIT

CROSS-REFERENCE TO RELATED APPLICATIONS

The present application claims priority to Application No. 2005-249747, filed in Japan on Aug. 30, 2005, which is expressly incorporated herein in its entirety by reference thereto.

FIELD OF THE INVENTION

The present invention relates to encoder signal processing circuits, e.g., that process signals that are outputted from detectors that detect the rotation of encoders that are attached to rotating bodies in motors, etc., as well as to linearly moving measured objects, and that detect displacement, e.g., number of rotations and/or angle of rotation, as well as traveling position, of measured objects.

BACKGROUND INFORMATION

The configuration illustrated, for example, in FIG. 10 of Japanese Published Patent Application No. 2002-90183, is an example of a conventional encoder signal processing circuit. FIG. 10 is a block view, abstracting the basic constituent parts for the purpose of counting the number of rotations of a rotary encoder.

FIG. 10 of Japanese Published Patent Application No. 2002-90183 is reproduced herein as FIG. 7. The encoder in FIG. 7 includes: a detection device 71, for detecting positional information from a code disc; a code disc 72, which includes the aforementioned positional information; a waveform shaping device 73, which shapes waveforms of positional data signals from the code disc that are detected by the aforementioned detection device; a data processing device 74, which processes positional data signals that are obtained from the waveform shaping device 73, and synchronize them to a predetermined clock; an edge detection device 75, which detects the rising (HP) and falling (LP) edges of data signals that are outputted from the data processing device 74; a selection device 76, which performs selection processing of rising signals (HP) and falling signals (LP) outputted from the edge detection device, and generates up count signals (UP) and down count signals (DOWN); a counting device 77, which counts up or count down, according to whether the aforementioned up count signals (UP) or down count signals (DOWN) are inputted; a timing generation device 78, which provides selection timing for the aforementioned detection device, and supplies a clock for the purpose of synchronization with data processing device 74 and edge detection device 75.

When the code disc of an encoder so arranged rotates, pulse signals, which are positional data signals corresponding to a slit in the code disc 72, according to the detection speed thereof, are emitted toward photosensors SA and SB, respectively. The waveform shaping device 73 removes noise, etc., from these pulse signals, and shapes them into generally rectangular shaped pulse waveforms DA1 and DB1, which can be inputted to a logic circuit.

These shaped positional data signals DA1 and DB1 are inputted to the data processing device 74, which operates to synchronize them with the slit detection timing signals. The data processing device 74 samples data signals according to a clock CK1, which is synchronized with the operation of detection device 71, which detects the slit, and maintains the input status of data signals DA1 and DB1, respectively.

DA2, one of the positional data signals that has been processed by the data processing device 74, is inputted to edge detection device 75. The edge detection device 75 detects the rising (HP) and falling (LP) edges of signals that are inputted, and output signals HP and LP, corresponding to these. The output of edge detection device 75 is inputted to the selection device 76. DB2, the other signal that is outputted from the data processing device 74, is inputted to the selection device 76, and the rotational direction of the encoder is determined from the output from the edge detection device 75. For each rotation, there is one pulse of UP output or DOWN output, corresponding to rotational direction CW (clockwise) or CCW (counterclockwise)

In the present example, there is a 90° phase difference between the phases of positional data signals DA1 and DA2, which are outputted according to rotational direction. The sequence of the positional data signals DA1 and DA2 can be ascertained based on the aforementioned rising (HP) and falling (LP) signals and rotational direction can be determined thereby.

Hence, the slit in the code disc 72 is detected on a predetermined cycle, according to the timing signal that is supplied by the timing generation device 78, as a positional detection signal, and this is changed into an UP or DOWN signal, depending on the phase relationship of the two signals. The number of rotations is counted by the counting device 77.

However, the waveform shaping device 73 requires a number of waveform shaping circuits corresponding to the detectors constituting the detection device 71, and if the number of detectors is increased, the number of waveform shaping circuits must also be increased. Reducing the number of parts is a response to the demand for miniaturization, but the presence of a multiplicity of waveform shaping circuits, duplicating similar functions, is believed to be a disadvantage. Reducing the number of circuits and other parts is also desirable from the standpoint of increased reliability and reduced energy consumption.

SUMMARY

Example embodiments of the present invention may provide a small, compact, low-cost, highly reliable encoder in which the circuit arrangement is simplified in its construction and in which the number of parts is reduced.

According to an example embodiment of the present invention, an encoder signal processing circuit includes: a plurality of detectors adapted to generate signals with different phases; a switching circuit adapted to alternatively select and output a signal from the detectors; and a waveform shaping circuit adapted to shape waveforms of output signals from the detectors that are switched by the switching circuit.

The encoder signal processing circuit may include a direction determining/counting unit adapted to: (a) monitor output signals from the waveform shaping circuit in relation to an operation of the switching circuit, (b) determine a direction of movement and an amount of movement; and (c) calculate the amount of movement.

According to an example embodiment of the present invention, an encoder signal processing circuit includes: detecting means for generating signals with different phases; switching means for alternatively selecting and outputting a signal from the detecting means; and waveform shaping means for shaping waveforms of output signals from the detecting means that are switched by the switching means.

Example embodiments of the present invention may render unnecessary arrangements in which circuits having similar functions are duplicated, since it may provide a waveform shaping circuit to be used in common by multiple detectors, so that a small, compact, low-cost, highly reliable encoder may be provided.

Example embodiments of the present invention are described in more detail below with reference to the appended Figures.

DETAILED DESCRIPTION

Figure 1:
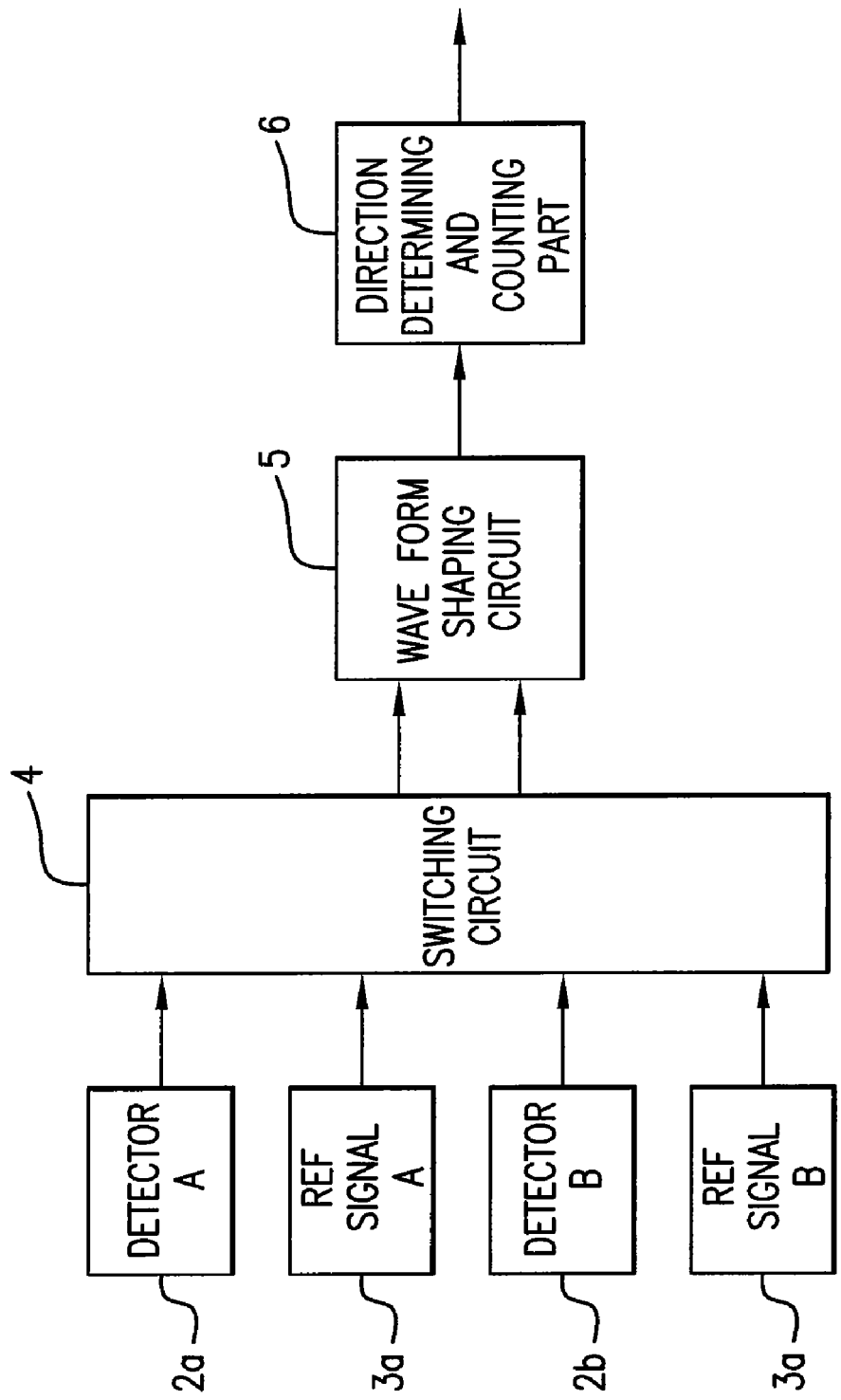
FIG. 1 is a block diagram illustrating an encoder signal processing circuit according to an example embodiment of the present invention.

The encoder signal processing circuit includes, for example, as illustrated in FIG. 1: multiple detectors 2a and 2b, which generate signals with different phases; a switching circuit 4, which alternatively selects and outputs a signal from the multiple detectors 2a and 2b; and a waveform shaping circuit 5 that shapes waveforms of output signals from the detectors 2a and 2b that are switched by the switching circuit. A direction determining/counting unit may be provided that monitors output signals from the waveform shaping circuit 5 in relation to the operation of the switching circuit 4, determines the direction of movement and the amount of movement, and calculates the amount of movement.

Providing a switching circuit 4 that alternatively selects and outputs signals from the detectors 2a and 2b in this manner provides waveform shaping processing of output signals from multiple detectors by a single waveform shaping circuit, providing, e.g., device simplification, lower cost, and reduced energy consumption through reduction in the number of waveform shaping circuits. In addition, output signals from multiple detectors that are processed in this manner by a single waveform shaping circuit may be processed without encountering problems by providing a direction determining/counting part that monitors output signals from the waveform shaping circuit in relation to the operation of the switching circuit 4, determines the direction of movement and the amount of movement, and calculates the amount of movement.

FIG. 1 is a block diagram illustrating the arrangement of an encoder signal processing circuit of an example embodiment of the present invention. To further describe FIG. 1, the example of a signal processing circuit that is illustrated has, as multiple detectors, both detector A 2a and detector B 2b, which generate two signals with different phases, based on a code pattern that is arranged on a code disc. Detector A 2a and detector B 2b also each have, respectively, a reference (ref) signal A generating part 3a and a reference (ref) signal B generating part 3b that generate reference (ref) signals.

The output signals that are outputted from the detectors 2a, 2b and the reference signals from the reference signal generating parts 3a, 3b are inputted to the switching circuit 4. The switching circuit 4 switches either the output signal from the detector A 2a and the reference signal from the reference (ref) signal A generating part 3a, or the output signal from the detector B 2b and the reference signal from the reference (ref) signal B generating part 3b to the waveform shaping circuit 5. In the waveform shaping circuit 5, the selected output signal from the detector A 2a or detector B 2b is binarized at level H or L, by using the corresponding reference signal from reference (ref) signal A generating part 3a or reference (ref) signal B generating part 3b as threshold level. Thus, the waveforms are shaped into digital signals, that is, rectangular pulse signals. In this example, two reference signal generating parts 3a, 3b are arranged, corresponding to detector A 2a and detector B 2b, for phase A and phase B, but the reference signal from a single reference signal generating part may also be used in common. In this instance, it is not necessary to switch the reference signals from reference signal generating parts 3a, 3b in the switching circuit 4, too.

The output signals from the detector A 2a and the detector B 2b, the waveforms of which are shaped in the waveform shaping circuit 5, are, moreover, inputted to a direction determining/counting part, and processed. The signal outputted from the waveform shaping circuit 5 is a signal in which the output signals from multiple detector A 2a and detector B 2b are combined. However, if this output signal is detected in relation to the operation of the switching circuit, it may be detected as the output signal of the detector A 2a at the time of switching to phase A, and it may be detected as the output signal of the detector B 2b at the time of switching to phase B. That is, the type of signal presently switched to may be ascertained by controlling the switching operation. Movement may be determined, and the amount of movement may be calculated as a predetermined counted value, by evaluating and determining the phase relationship of these phase A and phase B signals.

Multiple detectors may be supported even by a single waveform shaping circuit, by providing a switching circuit and a direction determining/counting part that determines direction by detecting signals related to the switching circuit. It is therefore unnecessary to provide redundant waveform shaping circuits that duplicate functions. Reliability may be improved through circuit simplification, the number of parts may be reduced, devices may be made smaller, costs may be lowered, and energy may be conserved.

Figure 2:
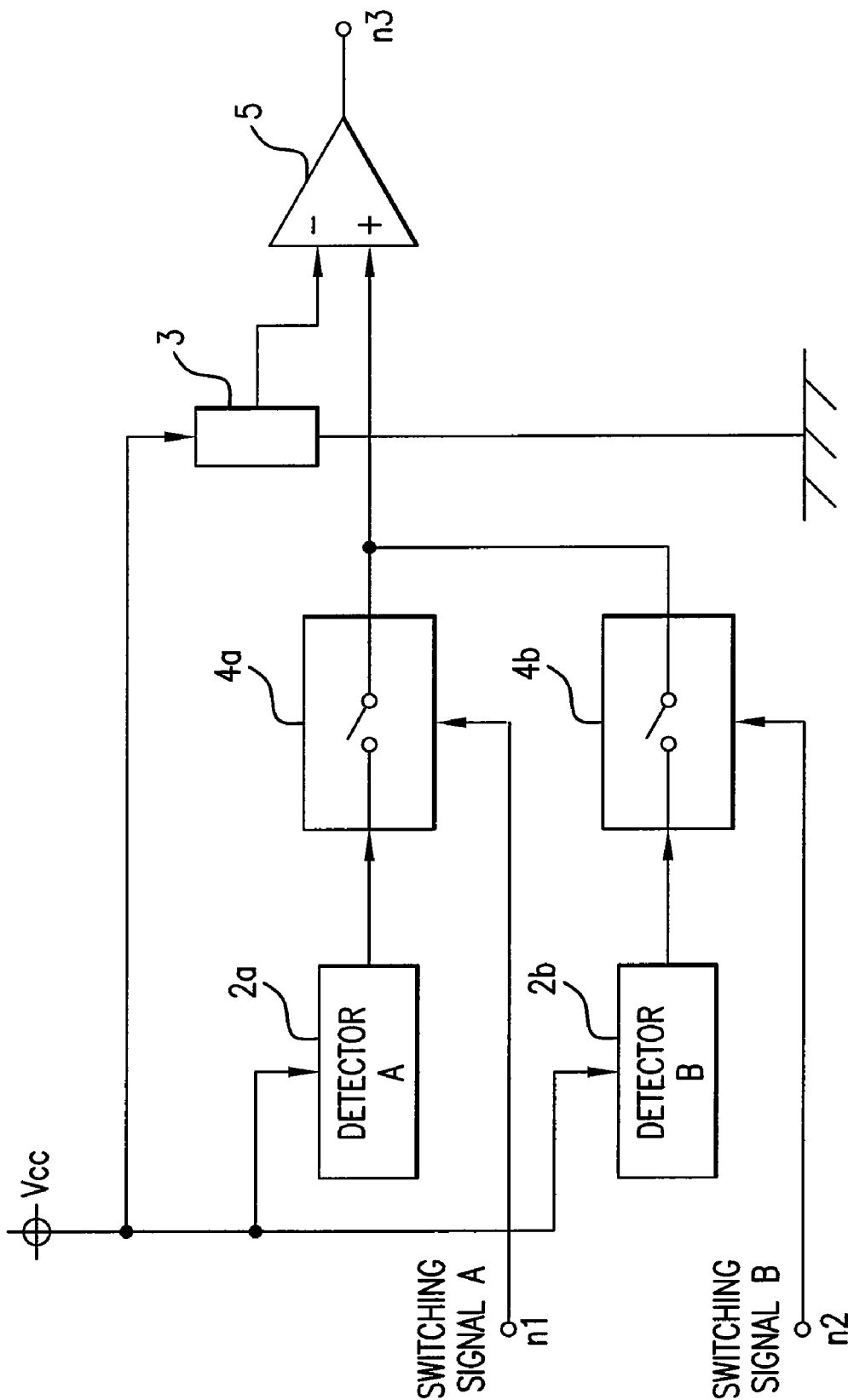
FIG. 2 is a block diagram illustrating an encoder signal processing circuit according to an example embodiment of the present invention.

FIG. 2 is a block diagram illustrating an encoder signal processing circuit according to an example embodiment of the present invention. The signal processing circuit includes two detectors A 2a and B 2b, and two analog switches 4a and 4b constituting a switching circuit. The output terminal of the detector A 2a is connected to one terminal of the analog switch 4a, and the output terminal of the detector B 2b is connected to one terminal of the analog switch 4b. The other terminals of the analog switches 4a and 4b are connected to one input terminal (+) of a differential input IC of a comparator, etc., constituting a waveform shaping circuit.

The midpoint of the reference signal generating part 3 is connected to the other input terminal (−) of the differential input IC of the comparator, etc. One of the two terminals of the reference signal generating part 3 is connected to the power source Vcc, and the other terminal is grounded. That is, the power source Vcc voltage is divided, and the reference signal of the predetermined reference voltage is inputted to the other input terminal (−) of the differential input IC of the reference signal generating part 3.

The reference signal generating part 3 in this example is arranged such that the power source voltage is divided by an element having an impedance component, such as a resistor, but rather than being restricted to such arrangements, which are capable of generating a stable predetermined voltage, semiconductor properties may also be employed, as in a Zener diode, FET (field effect transistor), etc. This example also differs from the example illustrated in FIG. 1 in that only a single reference signal generating part is used, and a single reference signal may be shared by phase A and phase B. Therefore, the standard signal from the standard signal generating part may be inputted to the waveform shaping circuit without passing through a switching circuit.

The two detectors A 2a and B 2b are also connected to power source Vcc, and supplied therefrom. The terminal n1, to which switching signal A is inputted, is connected to the control terminal of the analog switch 4a, and the terminal n2 to which switching signal B is inputted is connected to the control terminal of the analog switch 4b. When switching signal A is inputted, the analog switch 4a becomes conductive, and the output signal from the detector A 2a is supplied to the waveform shaping circuit 5. On the other hand, when switching signal B is inputted, the analog switch 4b becomes conductive, and the output signal from the detector B 2b is supplied to the waveform shaping circuit 5. Thus, signals from either the detector A 2a or the detector B 2b are inputted alternatively to the waveform shaping circuit 5, depending on whether switching signal A or switching signal B is inputted. The waveforms are shaped in accordance with the reference signal from the reference signal generating part 3, and outputted to the terminal n3.

It should be appreciated that optical sensors, magnetic sensors, etc., may be used as detector A 2a and detector B 2b, requiring an electrical power source, as in the example embodiment illustrated. Output signals are generated in accordance with the optical information or magnetic information that is detected at the output terminal. In the example embodiment illustrated, the mechanical contact symbol is used for the analog switches, as in a relay, etc., but a switching element including a semiconductor is also possible.

The output signal from the waveform shaping circuit may be processed by a procedure similar to that described above. An example of this is described below.

Figure 3:
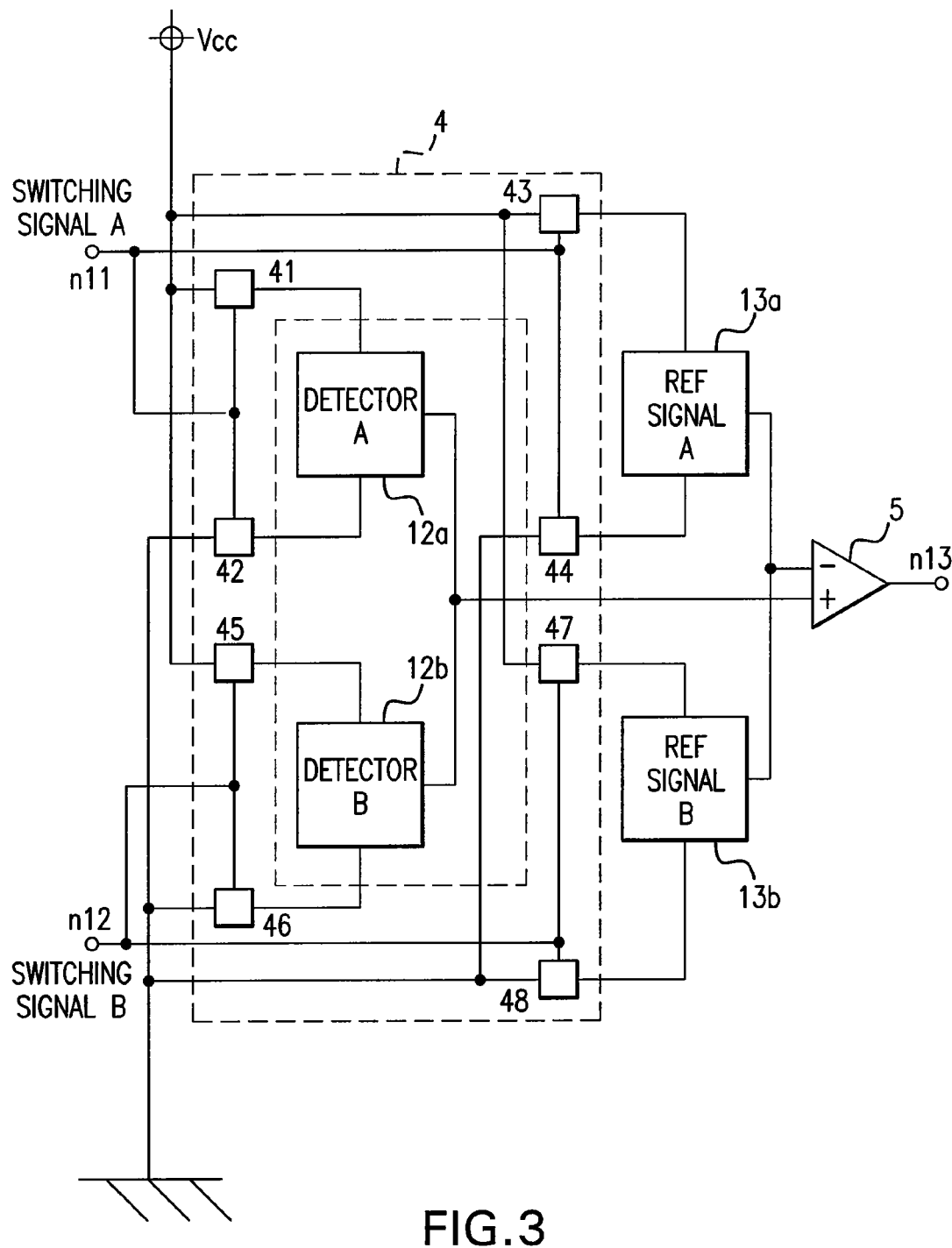
FIG. 3 is a block diagram illustrating an encoder signal processing circuit according to an example embodiment of the present invention.

FIG. 3 is a block diagram illustrating an encoder signal processing circuit of an example embodiment of the present invention. In this example, instead of the output signals from the two detectors A 12a and B 12b being switched, detectors 12a and 12b, which generate output, are switched, by switching the power source of these detectors A 12a and B 12b. The reference signals of the two reference signal generating parts 13a and 13b are also switched in a similar manner.

That is, the output terminals of the two detectors A 12a and B 12b are connected to one input terminal (+) of a differential input IC of a comparator, etc., constituting a waveform shaping circuit. The output terminals of both the reference signal A generating part 13a and the reference signal B generating part 13b are connected to the other input terminal (−) of the differential input IC that constitutes a waveform shaping circuit.

One terminal (on the power source side) of the detector A 12a and the reference signal A generating part 13a, and of the detector B 12b and the reference signal B generating part 13b, is connected to the power source Vcc via switching element 41, 43, 45, or 47, and the other terminal (on the ground side) of each is connected via switching element 42, 44, 46, or 48. Herein, switching elements 41 to 48 may be either elements as in a relay, having mechanical contacts, or semiconductor switches having conductive/non-conductive states, or logic elements having conductive/high-impedance states, etc., Among these, that which optimally fulfills the requirements may be provided.

The terminal n11, to which the switching signal A is inputted, is connected to the control terminals of the switching elements 41, 42, 43, and 44 on the phase A side, and terminal n12, to which the switching signal B is inputted, is connected to the control terminals of the switching elements 45, 46, 47, and 48. Thus, switching signal A is inputted to the terminal n11, the switching elements 41, 42, 43, and 44 on the phase A side become conductive, and a circuit of the electrical source Vcc, the switching element 41, the detector A 12a, the switching element 42 and ground is formed. Detector A 12a operates, and an output signal appears at the output terminal thereof. Similarly, a circuit of the electrical source Vcc, the switching element 43, the reference signal A generating part 13a, the switching element 44 and ground is formed. Reference signal A appears at the output terminal of the reference signal A generating part 13a.

Since the switching elements 45, 46, 47, and 48 on the phase B side are in an inhibited state, the detector B 12b and the reference signal B generating part 13b do not operate, so that neither the output signal nor the reference signal B is outputted. As a result, only the output signal of the detector A 12a and the standard signal A of the reference signal A generating part 13a on the phase A side are inputted to the waveform shaping circuit 5.

Similarly, when switching signal B is inputted to the terminal n12, the switching elements 45, 46, 47, and 48 on the phase B side become conductive, and the switching elements 41, 42, 43, and 44 on the phase A side are in an inhibited state. Therefore, only the output signal of the detector B 12b and the standard signal B of the reference signal B generating part 13b on the phase B side are inputted to the waveform shaping circuit 5. The phase B signal, which is waveform-shaped with the reference signal B as a reference value, is then output to the terminal n13. Thus, the output signals from the multiple detectors 12a and 12b that are inputted to the waveform shaping circuit and the reference signals from the reference signal generating parts 13a and 13b may be selected, even if the power source that supplies the detectors and the reference signal generating parts is controlled by a switching circuit.

The output signal from the waveform shaping circuit may be processed according to a method similar to that described above. An example of this is described below.

The following is an explanation of an example of the arrangement of a direction determining and counting part 6. Note that since the characteristic parts of the direction determining and counting part 6 in this example include processes that are expressed in software, detailed descriptions of ordinary circuits and elements that activate such software are omitted.

Figure 4:
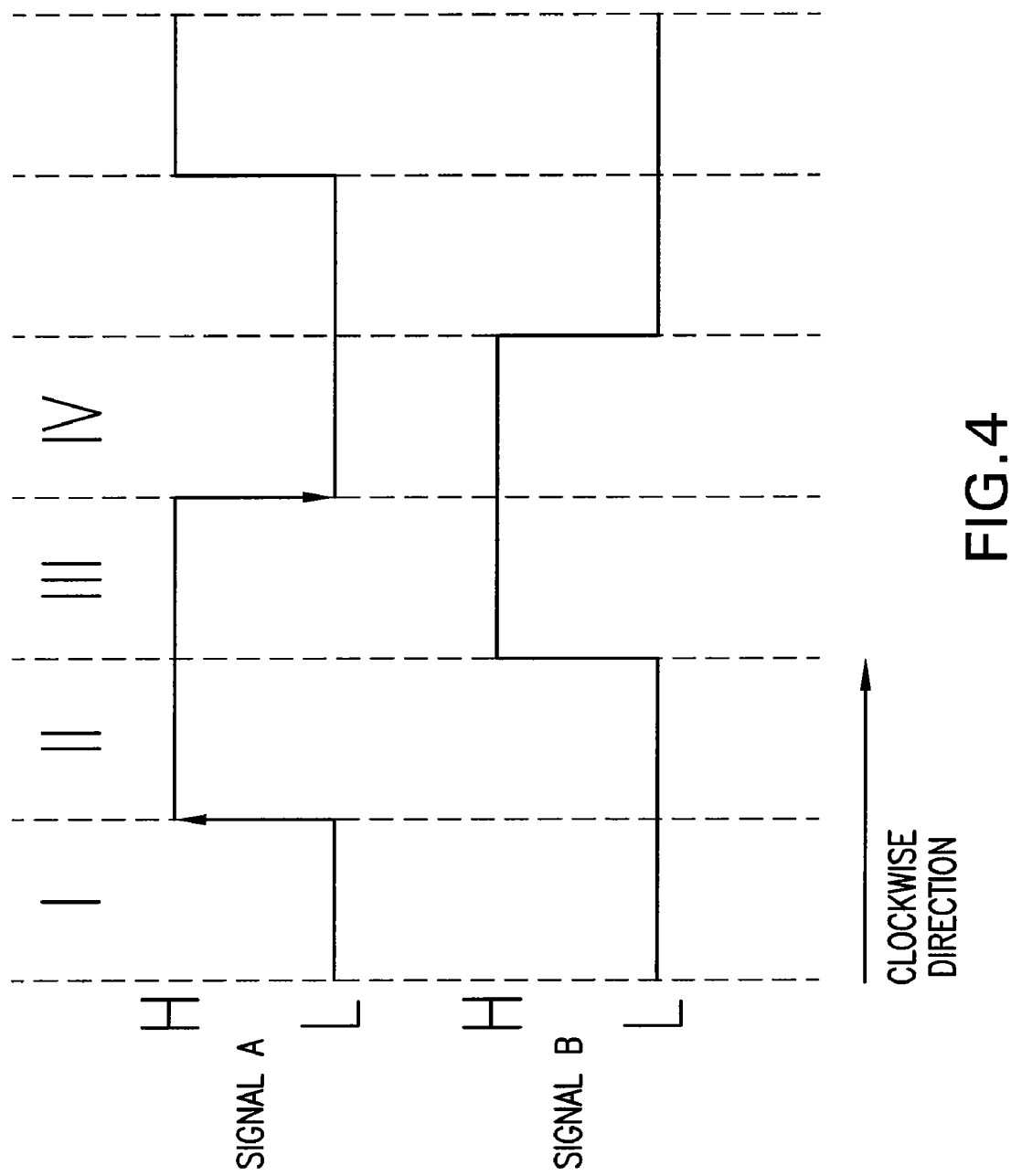
FIG. 4 is a timing chart of signal A and signal B, which have been outputted from a waveform shaping circuit.
Figure 5:
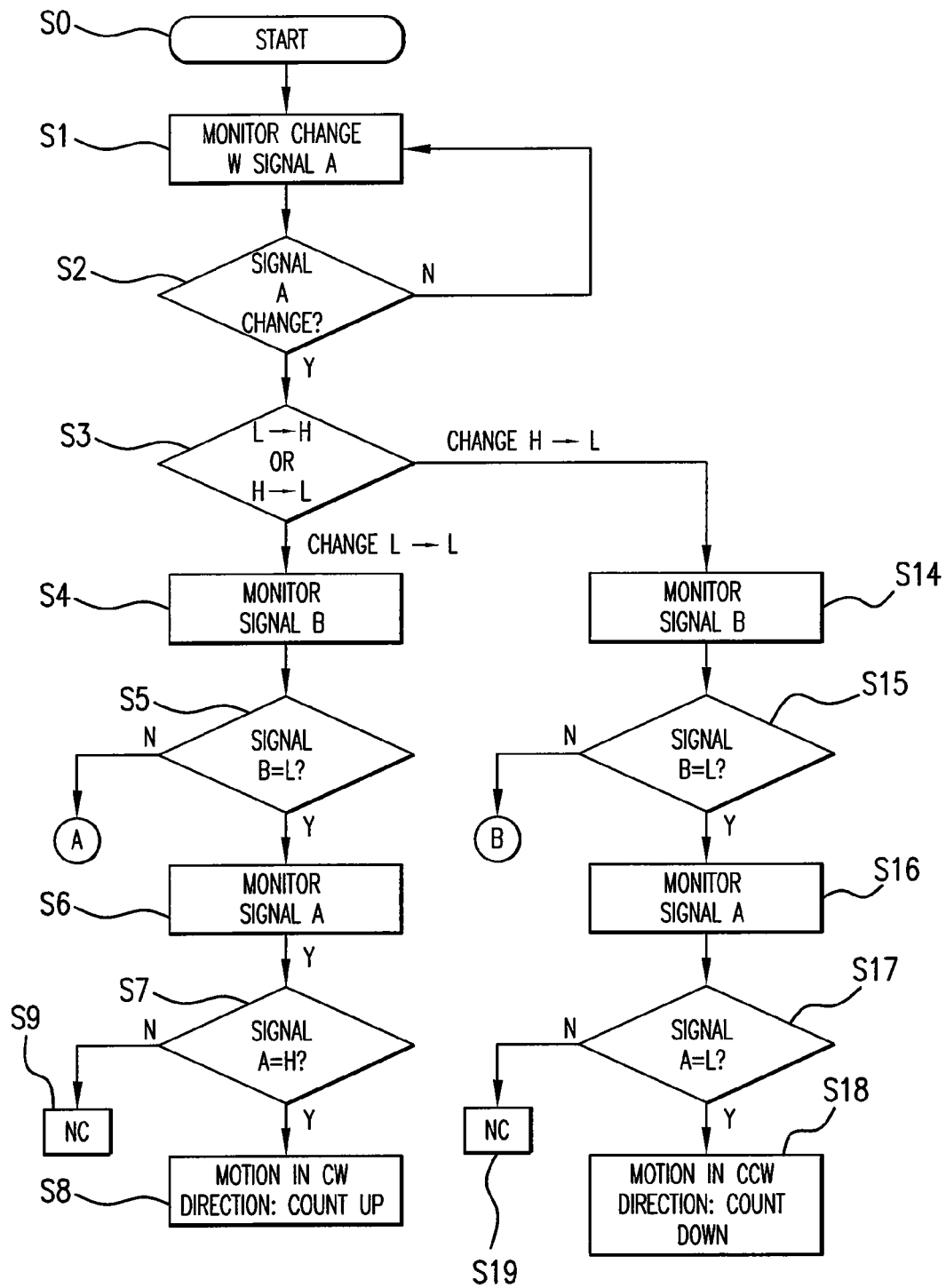
FIG. 5 is a flowchart illustrating the operation of a direction determining and counting part.
Figure 6:
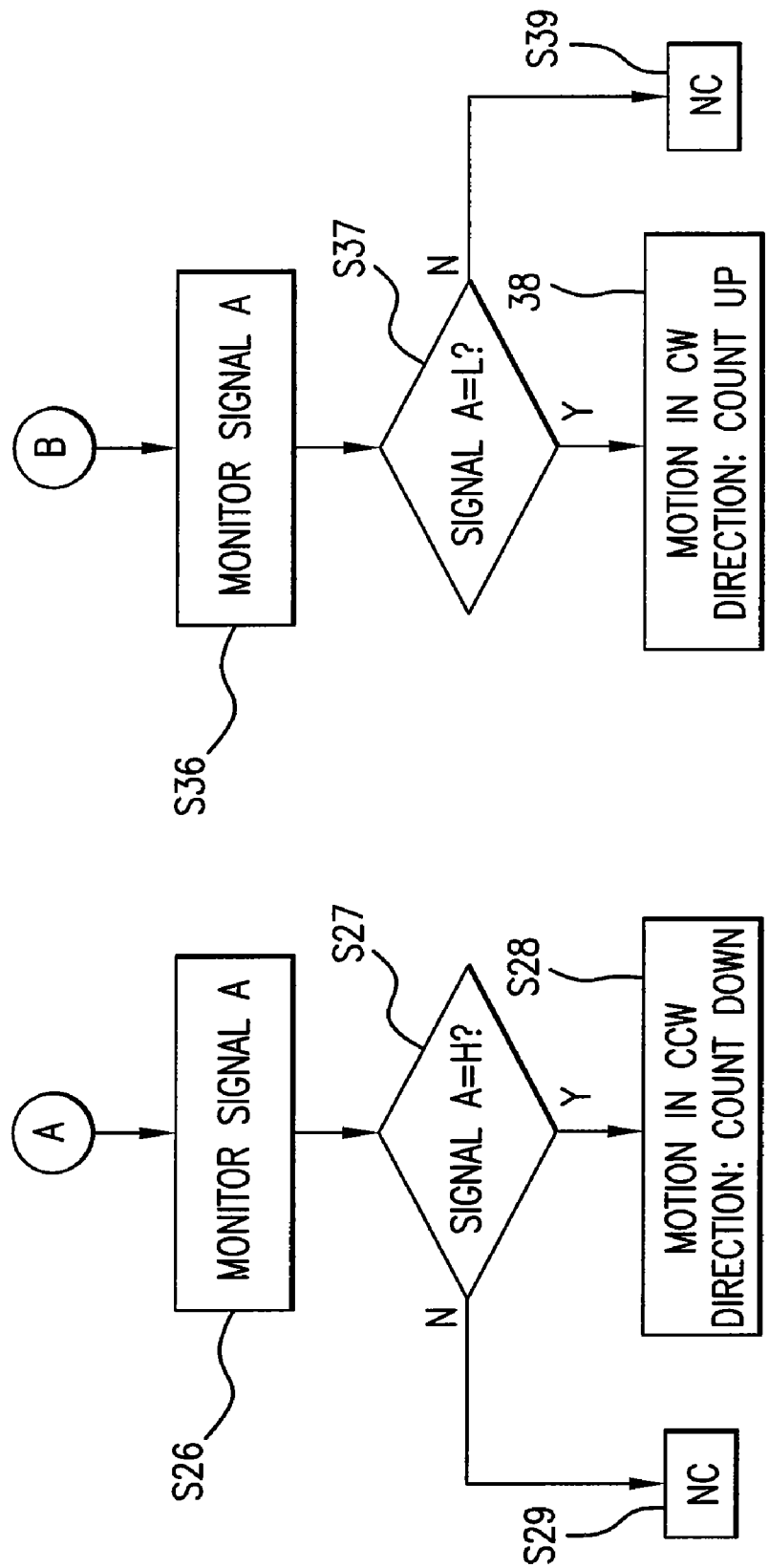
FIG. 6 is a flowchart illustrating the operation of a direction determining and counting part.
Figure 7:
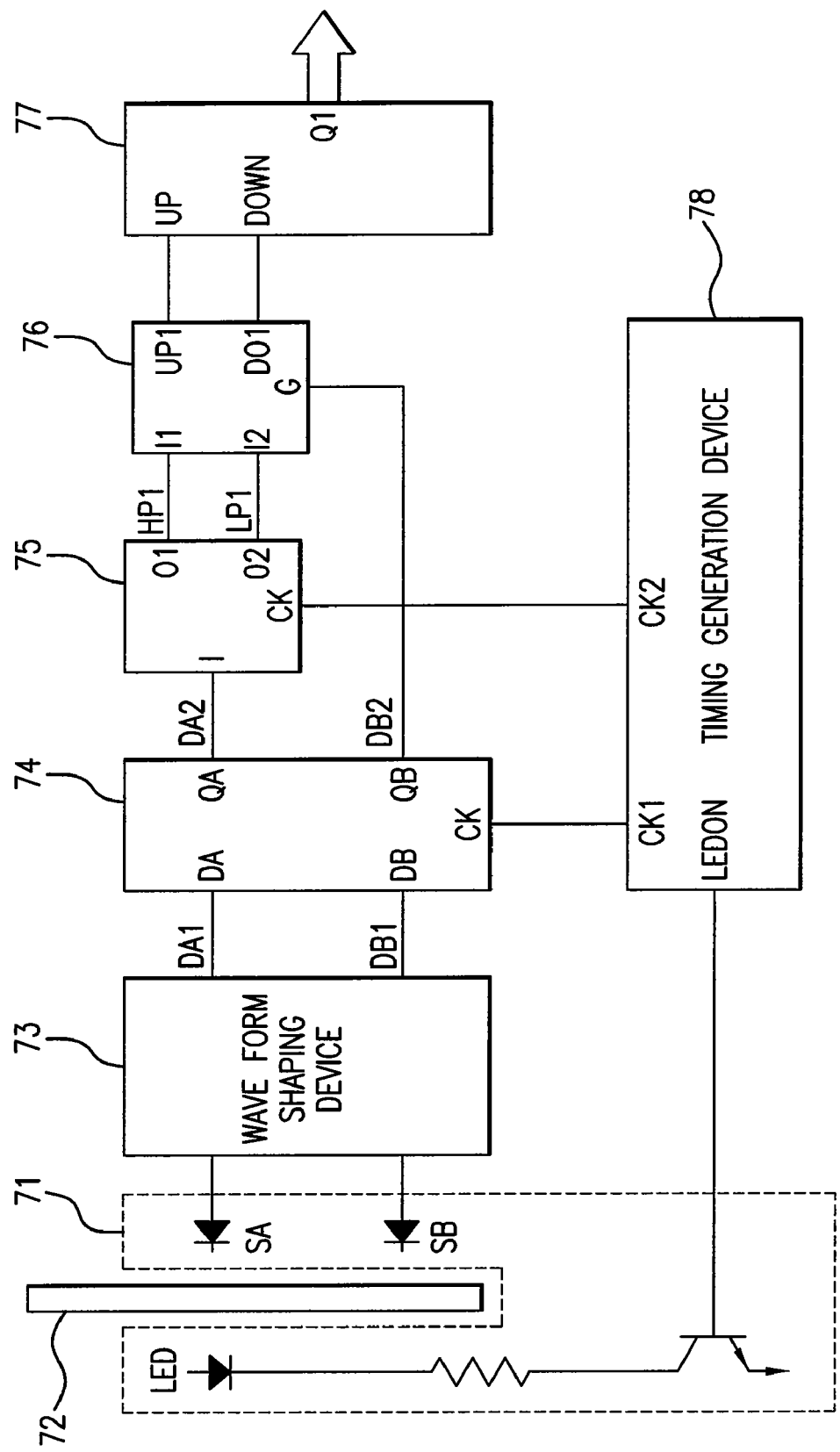
FIG. 7 is a block diagram illustrating a conventional encoder.

FIG. 4 is a timing chart of waveform shaped signals from detector elements that are outputted from a waveform shaping circuit, that is, of signal A and signal B, which are two signals differing in phase from phase A and phase B. FIGS.

5 and 6 are flowcharts showing the operation of the direction determining and counting part 6.

First, in initial state (S0), the direction determining and counting part monitors a signal in phase A or B, for example, signal A on the phase A side (S1). Accordingly, the switching circuit operates at this time such that the output signal is transmitted from the detector element on the phase A side.

Changes in the signal level that is detected are monitored (S2). If there is no change, monitoring continues, and if the level does change, the point of change is detected. The point of change may be detected, e.g., by various conventional techniques. For example, signals may be sampled at regular intervals of time, the signal level data stored, and previous data compared to recent data (or present data). If there is a change in signal level, that interval is then determined to be the point of change.

If a signal point of change is detected, the nature of the change, e.g., whether the change is from L level to H level, or from H level to L level, is determined, based on the levels before and after the change (S3).

If there is a change from L to H, the switching circuit 4 switches to the phase B side, assuming that the signal changes from area (I) to (II) illustrated in FIG. 4, and the level of the signal B is monitored on the phase B side (S4). If the signal B level is L level, taking the present status to be that of area (II) illustrated in FIG. 4 (S5), the signal switching circuit 4 once again switches to the phase A side (S6), and the level of signal A is confirmed (S7). If the signal A is H level, the shift in status to that of area (II) is confirmed, it is determined that movement is in a CW direction, and counting is upward (S8). If the code disc shakes during the time that signal A is at level L, counting does not proceed, since there is a possibility of noise or some other malfunction (S9).

If, in the aforementioned step (S3), there is a change from H to L, the switching circuit 4 switches to the phase B side, assuming that the signal changes from area (II) to (I) illustrated in FIG. 4, and the level of the signal B is monitored on the phase B side (S14). If the signal B level is L level, taking the present status to be that of area (I) illustrated in FIG. 4 (S15), the signal switching circuit 4 once again switches to the phase A side (S16), and the level of signal A is confirmed (S17). If the signal A is L level, the shift in status to that of area (I) is confirmed. It is determined that movement is in a CCW direction, and counting is downward (S18). If the code disc shakes during the time that signal A is at level H, counting does not proceed, since there is a possibility of noise or some other malfunction (S19).

If the level of signal B is level H in the aforementioned step (S5), assuming that it shifts to flow (A), and that the signal changes from area (IV) to (III) illustrated in FIG. 4, and taking the present status to be that of area (III) illustrated in FIG. 4, the signal switching circuit 4 once again switches to the phase A side (S26), and the level of signal A is confirmed (S27). If the signal A is H level, the shift in status to that of area (III) is confirmed. It is determined that movement is in a CCW direction, and counting is downward (S28). If the code disc shakes during the time that signal A is at level L, counting does not proceed, since there is a possibility of noise or some other malfunction (S29).

If the level of signal B is level H in the aforementioned step (S15), assuming that it shifts to flow (B), and that the signal changes from area (III) to (IV) illustrated in FIG. 4, and taking the present status to be that of area (IV) illustrated in FIG. 4, the signal switching circuit 4 once again switches to the phase A side (S36), and the level of signal A is confirmed (S37). If the signal A is L level, the shift in status to that of area (IV) is confirmed. It is determined that movement is in a CW direction, and counting is downward (S38). If the code disc shakes during the time that signal A is at level H, counting does not proceed, since there is a possibility of noise or some other malfunction (S39).

In this manner, it is determined whether the signal that is switched by the switching circuit 4 is signal A from the phase A side or signal B from the phase B side, and the levels of both signals may be readily ascertained by switching as necessary to provide detection of the signal on the side requiring confirmation. Based on the phase A and phase B signal levels, as well as the point of change thereof, the phase relationship between the two may be ascertained. Whether rotation is clockwise (CW) or counterclockwise (CCW) is determined, and directional movement quantity is computed by counting up for clockwise rotation, and counting down for counterclockwise rotation.

In this example, the point of change is detected by monitoring the signal on the phase A side in the initial state, but the point of change may also be detected by monitoring the phase B side. Both phase A and phase B may also be monitored by switching the signals at a speed that provides detection of the point of change. And while two signals with different phases are used to determine the CW/CCW rotational direction in the present example, the direction of movement, etc., may also be determined on a plane surface combining the direction of linear movement with the rotational directions, if the movement direction are determinable from the phase difference of the signals, and the amount of movement is computable.

A device for performing the foregoing process can be provided using an ordinarily used computer system, combining a multipurpose or dedicated processor and peripheral elements thereof, and also using a programming language that is optimal for these. For example, a direction determining and counting part may be provided, without increasing the number of parts, by appropriating control elements of dedicated processors, etc., that are already in use for use as an encoder control device.

As noted above, the ability to eliminate the waveform shaping circuit by using a switching circuit, and to provide a direction determining/counting part, may contribute to a reduction in the number of encoder parts, as well as to smaller size, and energy conservation.

An application hereof is to encoders that are attached to rotating bodies in motors, etc., as well as to linearly moving measured objects, and that detect displacement, e.g., number of rotations and/or angle of rotation, as well as traveling position, of measured objects. It may also be applied to signal processing circuits for processing signals from multiple detectors, determining the phase relationship from these, and calculating under predetermined conditions.

What is claimed is:

1. An encoder signal processing circuit, comprising:
   a plurality of detectors adapted to generate signals with different phases;
   a switching circuit adapted to alternatively select and output a signal from the detectors;
   a waveform shaping circuit adapted to shape waveforms of output signals from the detectors that are switched by the switching circuit; and
   a direction determining/counting unit adapted to: (a) monitor output signals from the waveform shaping circuit in relation to an operation of the switching circuit, (b) determine a direction of movement and an amount of movement; and (c) calculate the amount of movement.

2. An encoder signal processing circuit, comprising:
detecting means for generating signals with different phases;
switching means for alternatively selecting and outputting a signal from the detecting means;
waveform shaping means for shaping waveforms of output signals from the detecting means that are switched by the switching means; and
direction determining/counting means for (a) monitoring output signals from the waveform shaping means in relation to an operation of the switching means, (b) determining a direction of movement and an amount of movement; and (c) calculating the amount of movement.

* * * * *